Figure 1:
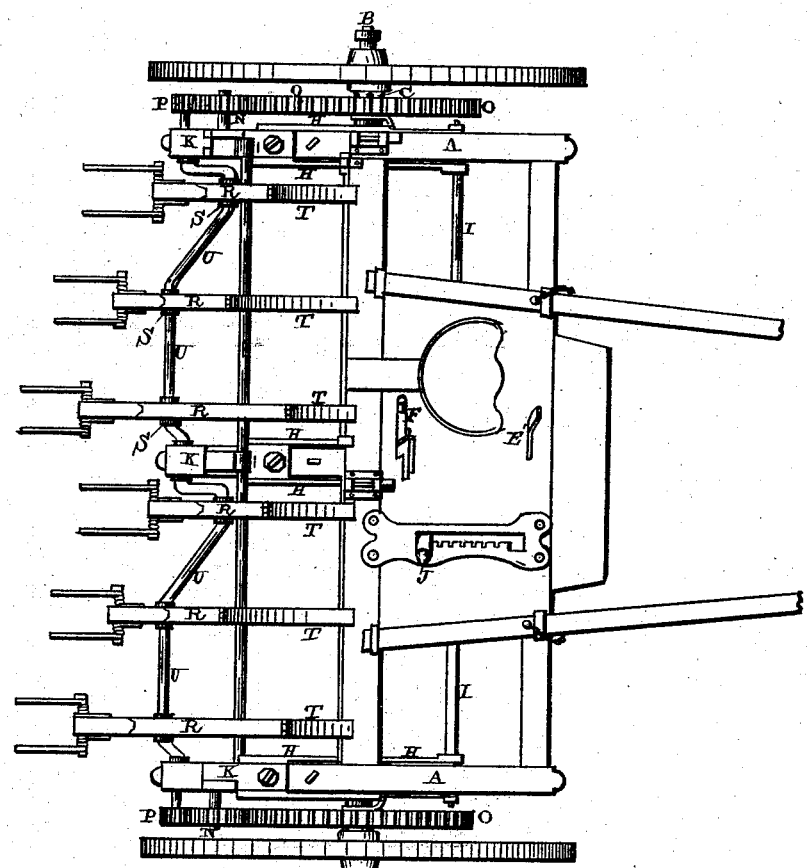

(No Model.) 5 Sheets—Sheet 1.

R. J. COLVIN.
COMBINED RAKE AND TEDDER.

No. 251,835. Patented Jan. 3, 1882.

Witnesses.
W. W. Mortimer
L. D. Forbes

Inventor.
R. J. Colvin,
per
F. A. Lehmann,
Atty (No Model.) 5 Sheets—Sheet 2.
R. J. COLVIN.
COMBINED RAKE AND TEDDER.
No. 251,835. Patented Jan. 3, 1882.
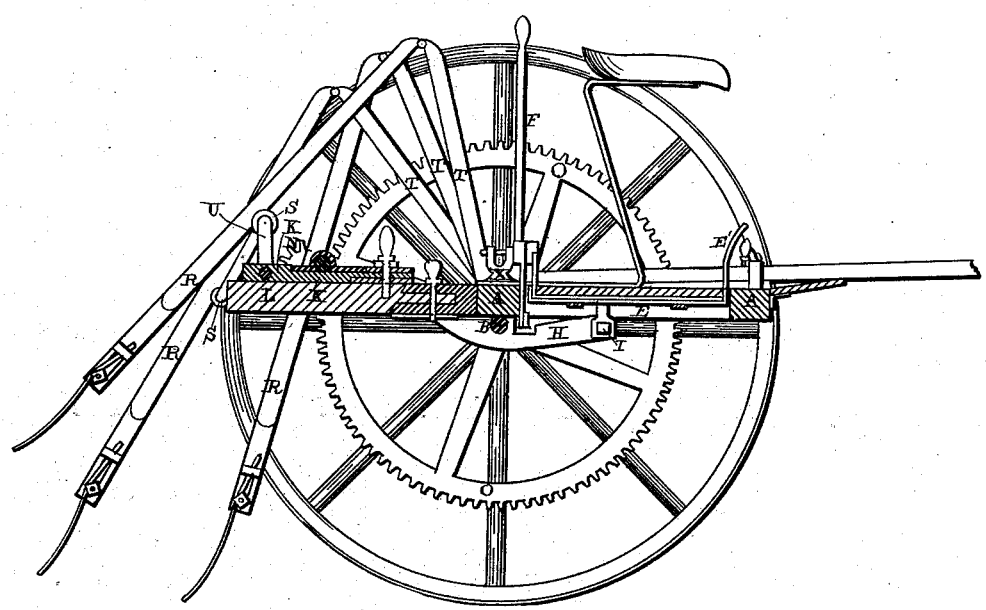
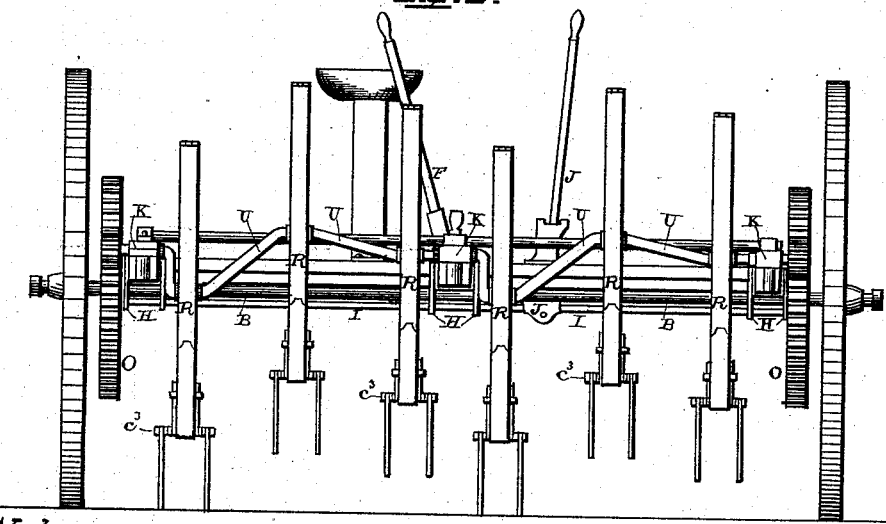

(No Model.) 5 Sheets—Sheet 3.

R. J. COLVIN.
COMBINED RAKE AND TEDDER.

No. 251,835. Patented Jan. 3, 1882.

Witnesses.
W. H. Mortimer
A. C. Kiskadden

Inventor
R. J. Colvin,
per
F. A. Lehmann,
Atty (No Model.)  5 Sheets—Sheet 4.

R. J. COLVIN.
COMBINED RAKE AND TEDDER.

No. 251,835.  Patented Jan. 3, 1882.

(No Model.) 5 Sheets—Sheet 5.
R. J. COLVIN.
COMBINED RAKE AND TEDDER.
No. 251,835. Patented Jan. 3, 1882.
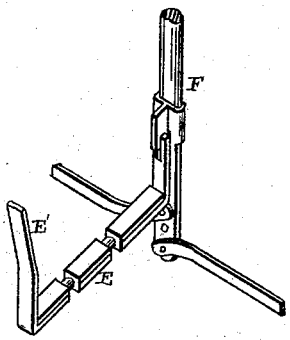
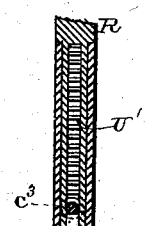
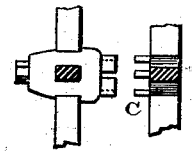
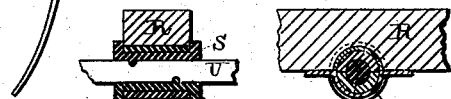
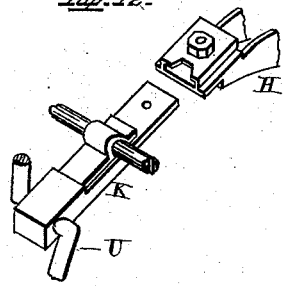
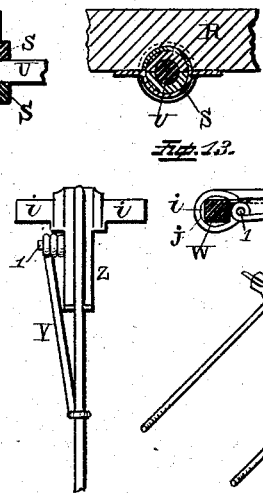
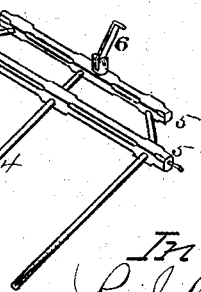
Witnesses.
Wm W Mortimer
A C Kiskadden
Inventor
R. J. Colvin,
per
F. A. Lehmann,
atty

UNITED STATES PATENT OFFICE.

ROBERT J. COLVIN, OF LANCASTER, PENNSYLVANIA, ASSIGNOR OF ONE-HALF TO ISRAEL L. LANDIS, OF SAME PLACE.

COMBINED RAKE AND TEDDER.

SPECIFICATION forming part of Letters Patent No. 251,835, dated January 3, 1882.

Application filed May 2, 1881. (No model.)

*To all whom it may concern:*

Be it known that I, ROBERT J. COLVIN, of Lancaster, in the county of Lancaster and State of Pennsylvania, have invented certain new and useful Improvements in Combined Hay Rake and Tedder; and I do hereby declare the following to be a full, clear, and exact description of the invention, such as will enable others skilled in the art to which it pertains to make and use it, reference being had to the accompanying drawings, which form part of this specification.

My invention relates to an improvement in combined hay rake and tedder; and it consists, first, in the combination of a suitably-constructed frame, a lever having secured to its lower end a rod, which is supported in suitable levers which are pivoted upon the axle, and which rod is adapted to operate both the hay rake and tedder without change of levers; second, in a series of levers which are pivoted upon the axle, and which have suitable means formed upon their upper ends for attachment to the boxing in which the shafts of the tedder revolve; third, in the combination of the axle, an operating-lever, and suitable levers to which the tedders are secured, whereby the tedders are raised and lowered upon the axle for the purpose of adapting them to the unevenness of the ground, and whereby the operating-wheels are kept always in gear, so that when raised above the ground their movement will not be stopped; fourth, in placing the tines of the fork upon a bolt which passes through a slot made in the lower end of the fork-handle, and having a spring placed upon its top and inside of the lower end of the handle, whereby the spring is prevented from being clogged by grass, and so that in case one of the tines should be broken it can be easily removed and replaced by another; fifth, in attaching to the cranked shaft suitable collars, which are made in two parts, and which revolve with the shaft, and which collars are attached to the fork-handles by means of suitable boxes or bearings, whereby all necessity of forging shoulders upon the cranked shaft is avoided; sixth, the rake ferrules placed upon a square or angular shaft, and stationary thereon, and each one having a small projection extending out from its side, around which is passed the coil of the spring, while the outer end of the spring bears upon the rake-tooth, each rake-tooth being so fastened to the ferrule that it can turn freely thereon whenever it encounters obstructions; seventh, it still further consists in the arrangement and combination of parts, which will be more fully described hereinafter.

Figure 15:
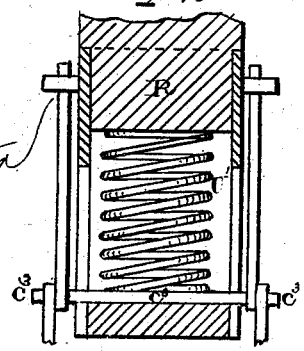
Figure 4:
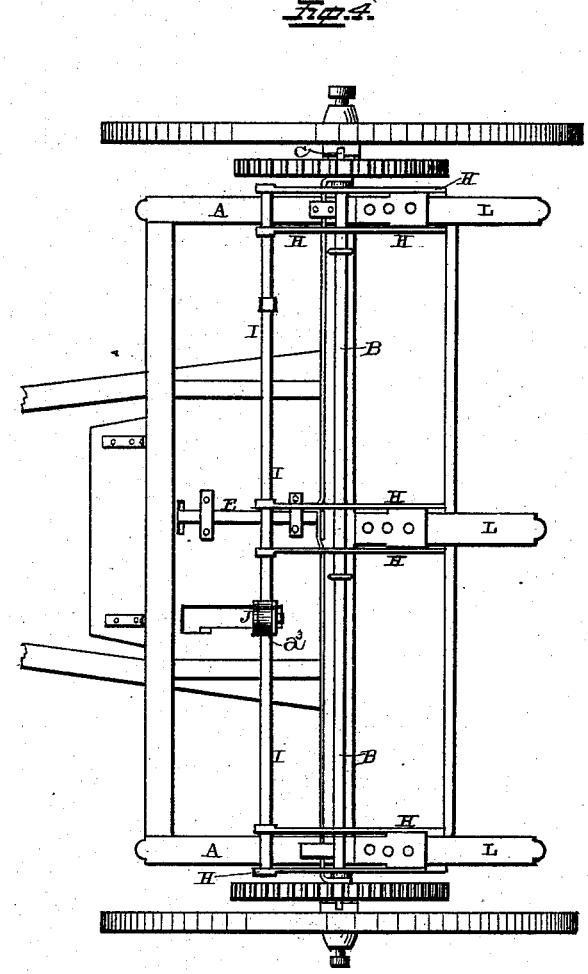
Figure 5:
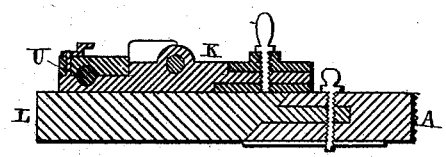
Figure 6:
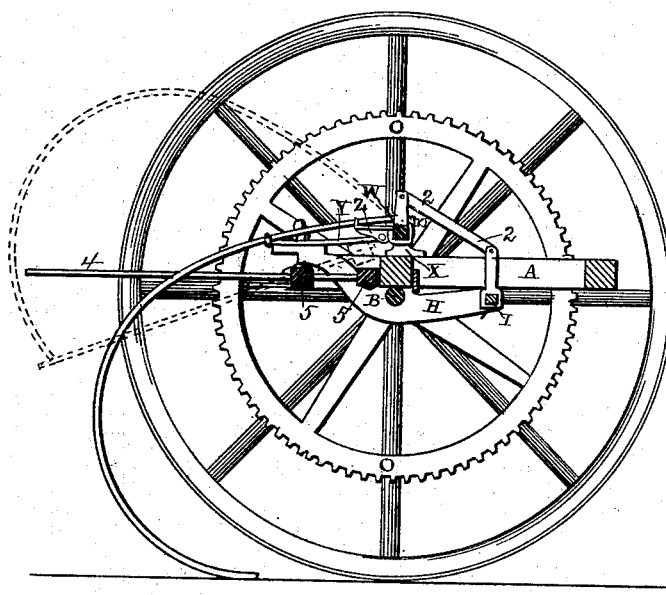
Figure 7:
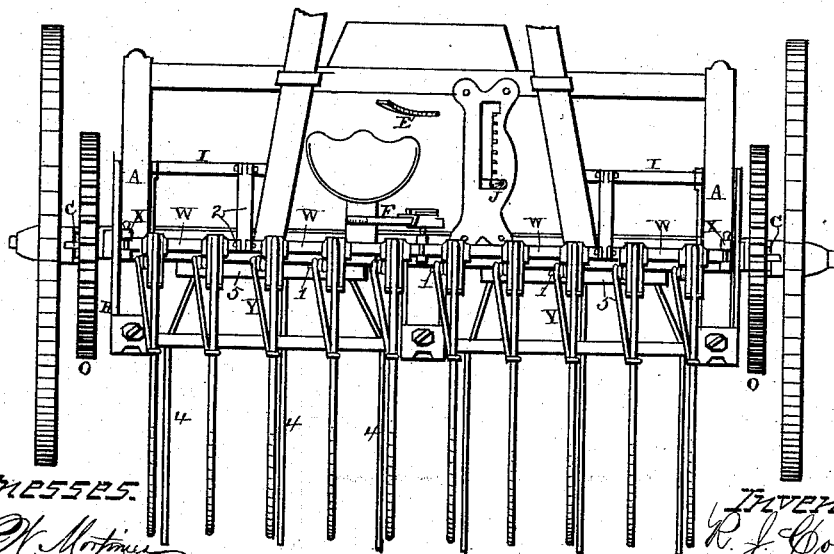

Figure 1 is a plan view of my invention when used as a tedder alone. Fig. 2 is a vertical section of the same. Fig. 3 is a rear view of the same. Fig. 4 is an inverted view of the same. Fig. 5 is a vertical section through the end of one of the beams and the attachment by which the tedder is connected thereto. Fig. 6 is a vertical section of my machine when used as a hay-rake alone. Fig. 7 is a plan view of the hay-rake and cleaner. Figs. 8 and 10 are detail views. Figs. 9 and 15 show two vertical sections of one of the handles, taken at right angles to each other. Fig. 11 shows two sectional views for the cranked shaft, taken at right angles. Fig. 12 is a perspective of the box-plate ready to be inserted in the end of the lever. Fig. 13 shows two different views of the rake-tooth and its spring. Fig. 14 is a perspective of the cleaner.

A represents the frame, which may be constructed as here shown, or in any other way that may be preferred, and which has the axle B secured to its under side. Upon each end of this axle is placed a loose driving-wheel, which is connected to and disconnected from the axle by means of the clutch C, which is operated from the center of the frame. The rock-shaft E, by means of which the clutch is operated, is provided with a foot-lever, E', at its front end, and a hand-lever, F, at its rear end, whereby the clutch may be operated by either hand or foot, as may be desired. This construction of parts is very necessary, from the fact that frequently the driver's hands are employed in holding the reins and levers at the same time, and hence he is compelled to use his foot. In case it should be inconvenient to use the foot for operating the clutch, he has but to catch hold of the lever F, when he can engage or disengage the driving-wheels at once; or, where the clutch does not work freely, he can use both hand and foot together.

Pivoted upon the axle are a series of levers, H, which are higher at their rear than their front ends, and which have their front ends secured to an angular rod, I, which extends along under the whole length of the frame. Upon the angular rod I is placed a stationary collar or fastening, $a^3$, and upon this collar is pivoted the operating-lever J. This collar $a^3$, having the lever pivoted to it, is secured to the shaft just under the opening in the frame for the lever to pass through, and serves as a means of attachment to the shaft for the lever without having to pivot the lever directly to the shaft. Thus pivoted, the lever has a movement in a line with the length of the shaft, whereby it can be moved in and out of the ratchets of the keeper, and will remain in one of the ratchets into which it has been adjusted, without the slightest danger of being thrown or forced out by the movement of the machine.

The rear ends of the levers H are curved upward, so as to extend above the top of the frame, and have suitable sockets or other connections of any desired description for the purpose of receiving the box-plates K, in which the operating-shaft and cranked shaft of the tedder are journaled. These box-plates are made to rest upon the extensions L, formed upon the rear ends of the timbers, and are rigidly secured in place by means of set screws or bolts, which are passed down through the sockets which receive the front ends of the box-plates. These extensions upon the timber can be either formed solidly therewith, or the frame may be cut and an extension, L, attached, as shown. When the extension is made removable, as here represented, it will be provided with suitable castings for catching over the rear ends of the timbers of the frame, and can be fastened in place by means of set screws or bolts, which are passed down through them. These levers H are pivoted upon the axle, and, having the sockets made upon their ends, allow the tedders to be removed and replaced as desired.

Journaled upon the box-plates, which are rigidly connected together by a rod, is the short shaft which carries the pinion N, which meshes both with the large driving-wheel O and the small pinion P, which is secured directly to the crank-shaft U. This large driving-wheel is connected to a clutch, so that it can be thrown in and out of gear at will. Whenever the large wheel is thrown out of gear, of course the tedder will stop operating at once. The cranked shaft U, instead of having the handles R attached to it in the usual manner, has here attached to it the collars S, which are made in two parts. Each one of these parts of the collar has a projection or teat on its inner side, which catches in a corresponding recess made in the shaft, and thus the shaft and the collar are made to revolve together. This collar is then attached to the rear of the fork-handle by means of a box or journal bearing, as shown. By means of this construction there is no necessity of forging collars upon the journal-bearings of the cranked shaft, as has heretofore been found necessary.

The front ends of the fork-handles are connected by means of the connecting-rods T, to which they are hinged, to the horizontal metallic bar, which is fastened in any suitable manner to the rear edge of the frame A. The lower end of each one of the fork-handles is bored out a suitable distance, and in this end is placed a spiral spring, U'. A suitable metallic box is then placed upon the fork-handle and secured thereto in any suitable manner. The forks are made of two separate tines, and each tine has its coil fastened upon the end of the rod or bolt which passes horizontally through the lower end of the fork-handle, and upon the top of which the spiral spring rests. The upper end of each tine passes through an eye or guide formed on the box which incloses the end of the fork-handle, so as to be held in position thereby. The slot made through both the box which incloses the end of the fork-handle and the handle itself may be inclined slightly backward to correspond to the pitch of the fork, and for the purpose of allowing the fork to give in case it should strike an obstruction, whenever an obstruction is encountered the tines raise the bolt $c^3$, upon which they are pivoted, so as to compress the spring; or each tine may rise without raising the other, and the upper end of each tine moves freely through the eye, which also acts as a guide to hold the tine in position. By thus inclosing the spring inside of the end of the fork-handle the spring is entirely protected from grass and other substances, which would only clog it up and prevent its action.

In case either one of the tines should be broken it is only necessary to remove the bolt, when the broken tine can be taken off and replaced by a new one.

The levers H, by which the tedder is moved, being pivoted upon the axle, the operator can, by means of the operating-lever, raise the tedders whenever occasion may require, and the tedders will continue to operate unless thrown out of gear. This construction prevents the necessity of having to stop the tedders whenever they are raised upward for the purpose of passing over obstructions.

Whenever it is desired to use a rake the tedder above described is removed by raising the set-screws which hold the box-plates in the sockets formed on the rear ends of the levers H, and the clasp which holds the horizontal rod or bar which connects the front ends of the connecting-rods in position is turned back, and then the whole tedder can be removed. The levers H always remain in position whether the machine is used as a rake or tedder. When the rake is to be used the two ends of the square tooth-bar W are placed in the bearings X, which are permanently secured to the top of the frame A. This tooth-bar is made square or angular, as shown, and upon it are placed a number of ferrules, $i$, for the attachment of rake-teeth and the springs Y, which operate upon the teeth. These ferrules are stationary upon the bar, and each ferrule has a groove, j, formed in it to receive the front end of the tooth, which is so connected to the ferrule that the tooth can turn or rise freely upward. Projecting rearwardly from each one of these ferrules is a brace or support, Z, which catches under the tooth, and projecting from the side of the ferrule is a projection, 1, around which the coil of the spring Y is placed. By this arrangement of parts it will readily be seen that the tooth can only move a certain distance downward, in which position it is always held by the pressure of the spring upon it; but should any obstruction be encountered the tooth may freely yield to the same and then snap back into position again. When the square tooth-bar is turned by means of the operating-lever the braces raise the teeth upward in a body.

One of the ferrules upon the tooth-bar is provided with an arm or projection, and to this arm is fastened a connecting-rod, 2, which has its front end secured to the angular bar to which the operating-lever is secured. By this means it will be seen that the same lever and the same angular bar are used to operate either the tedder or the rake.

Secured to the projections upon the rear end of the frame are suitable bearings formed for the reception of the pivots of the cleaner 4. This cleaner consists of the teeth and two parallel bars, the rear one of which is provided with pivots.

To the front one of the two bars 5 is secured a suitable connecting rod, plate, or other device, 6, which is united at its upper end with the angular tooth-bar. By means of this arrangement of parts, when the rake-teeth are raised upward the teeth of the cleaner are moved downward, so as to clean the rake-teeth when raised.

Having thus described my invention, I claim—

1. In a combined hay rake and tedder, the combination of an operating-lever, an angular shaft connected thereto, and suitable levers or rods fastened to the shaft, whereby the shaft may be made to operate either a tedder or a rake, substantially as shown.

2. The combination of the axle B, the levers H, secured at their front ends to the rod I and provided with sockets on their rear ends, with removable boxes, in which the tedder-shaft is journaled, substantially as described.

3. In a hay-tedder, the removable boxes K, having a short shaft secured to their outer sides, the intermediate wheels, N, for meshing with driving wheels O, the tedder-shaft U, provided with the pinions P, levers H, rod I, and lever J, substantially as set forth.

4. The combination of the cranked shaft, the fork-handles, the collars connected to the shaft, and the boxes or bearings for securing the collars and shaft to the fork-handles, substantially as set forth.

5. In a tedder-fork, the combination of the two separate tines, a bolt which passes through the end of the fork-handle, a spring which bears upon the top of the bolt, and suitable guides for the upper ends of the tines, whereby the fork or tines can be relieved when striking an obstruction, substantially as shown.

6. In a hay-tedder, the combination of a series of box-plates united together by connecting-rods, a driving-pinion, and the cranked shaft, the box-plates being adapted to be removed from the frame, substantially as described.

7. The combination of the angular rod W, the stationary ferrules i, placed thereon, and provided with the grooves j, supports Z, and projections 1, with the springs Y and rake-teeth, substantially as specified.

In testimony whereof I affix my signature in presence of two witnesses.

R. J. COLVIN.

Witnesses:
C. S. DRURY,
W. W. MORTIMER.